United States Patent [19]

Spisak

[11] 4,133,583
[45] Jan. 9, 1979

[54] WHEEL AND TRIM ASSEMBLY

[76] Inventor: Edward G. Spisak, 35700 Oakwood La., Westland, Mich. 48185

[21] Appl. No.: 856,308

[22] Filed: Dec. 1, 1977

[51] Int. Cl.² .............................................. B60B 7/06
[52] U.S. Cl. .............................. 301/37 TP; 301/37 P; 301/37 S
[58] Field of Search ................ 301/37 R, 37 T, 37 P, 301/37 TP, 37 PB, 37 S, 108 R, 108 A, 108 S

[56] References Cited

U.S. PATENT DOCUMENTS

| 1,234,968 | 7/1917 | Timmerhoff | 301/108 S |
| 2,952,491 | 9/1960 | Lyon | 301/37 TP |

FOREIGN PATENT DOCUMENTS

| 544469 | 2/1932 | Fed. Rep. of Germany | 301/108 R |
| 919394 | 10/1954 | Fed. Rep. of Germany | 301/37 TP |
| 2542973 | 4/1977 | Fed. Rep. of Germany | 301/108 R |
| 866471 | 5/1941 | France | 301/37 TP |
| 760208 | 12/1933 | France | 301/108 R |

Primary Examiner—Stanley H. Tollberg
Assistant Examiner—Charles A. Marmor
Attorney, Agent, or Firm—Fisher, Gerhardt & Groh

[57] ABSTRACT

A vehicle wheel and trim assembly has a decorative trim member positioned in preselected symmetrical relation to the vehicle wheel by a retainer member on the trim member which engages retaining grooves formed in the nuts used to retain the vehicle wheel on its hub. The retainer member includes a guide arrangement which interferes with the nuts to prevent attachment of the trim to the wheel unless there is properly circumferential alignment and after attachment holds the wheel and trim against relative circumferential displacement.

9 Claims, 7 Drawing Figures

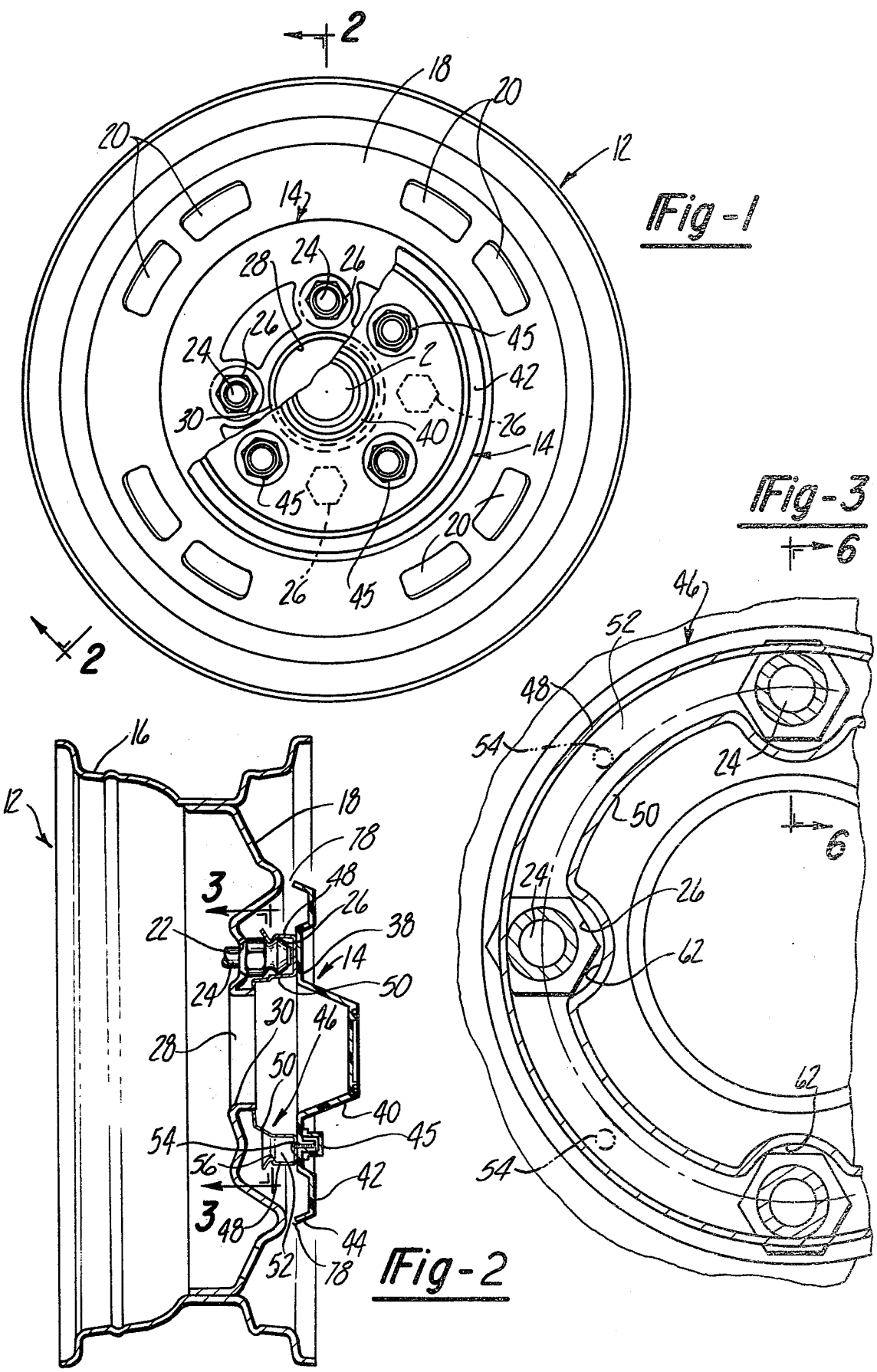

WHEEL AND TRIM ASSEMBLY

This invention relates to vehicle wheels and more particularly to a retention system for retaining a trim or ornamental member relative to the wheel.

Some automotive wheels are styled to have both ornamental and functional features and only the hub area of the wheel is covered with wheel trim in the form of a hub cap or other ornamental member as opposed to covering the whole wheel. However, such wheels are contoured to give a decorative appearance without affording surfaces which can be gripped with retainers to hold the wheel trim securely in position. Also ornamental or styled wheels which are to have a decorative trim applied at the hub of the wheel may be shaped so that if symmetrical relative positions are to be accomplished and maintained between the wheel and the wheel trim, it is necessary to provide some form of locating or indexing means.

It is highly desirable and is an object of this invention to provide a wheel and wheel trim assembly with a retention system which is not reliant on the contour of wheel surfaces to maintain the wheel trim in position.

Still another object of the invention is to provide a wheel trim assembly wherein the retention system incorporates means to index the wheel and wheel trim relative to each other so that they may be maintained symmetrically.

Another object of the invention is to provide a wheel and wheel trim assembly with a retention system which utilizes the usual wheel retaining nuts that are used to secure the wheel in position as part of the retention means.

A further object of the invention is to provide such an assembly in which the wheel securing nuts form part of the locating means by which trim and wheel are maintained symmetrically relative to each other.

The objects of this invention are accomplished by providing a wheel and trim assembly wherein the wheel is held in position relative to the vehicle by nuts on mounting studs and the nuts are provided with annular grooves which receive complementary retaining means forming part of the decorative wheel trim. The nuts also are formed with cam means which serves to guide the retaining means into position during axial movement of the wheel trim member relative to the wheel. The wheel trim member is further provided with guide means which prevents the wheeel trim member from being mounted relative to the wheel except in selected positions. The guide means include recesses to receive the wheel retaining nuts when the wheel trim member is properly circumferentially aligned with the wheel so that the wheel trim member can be moved axially toward the wheel and into retained, mounted position.

These and other objects of the invention will be apparent from the following description and from the drawings in which:

FIG. 1, is an elevation of a wheel and wheel trim assembly with portions of the trim assembly broken;

FIG. 2, is a cross-sectional view taken on line 2—2 in FIG. 1;

FIG. 3, is a cross-sectional view at an enlarged scale taken on line 3—3 in FIG. 2;

Figure 4:
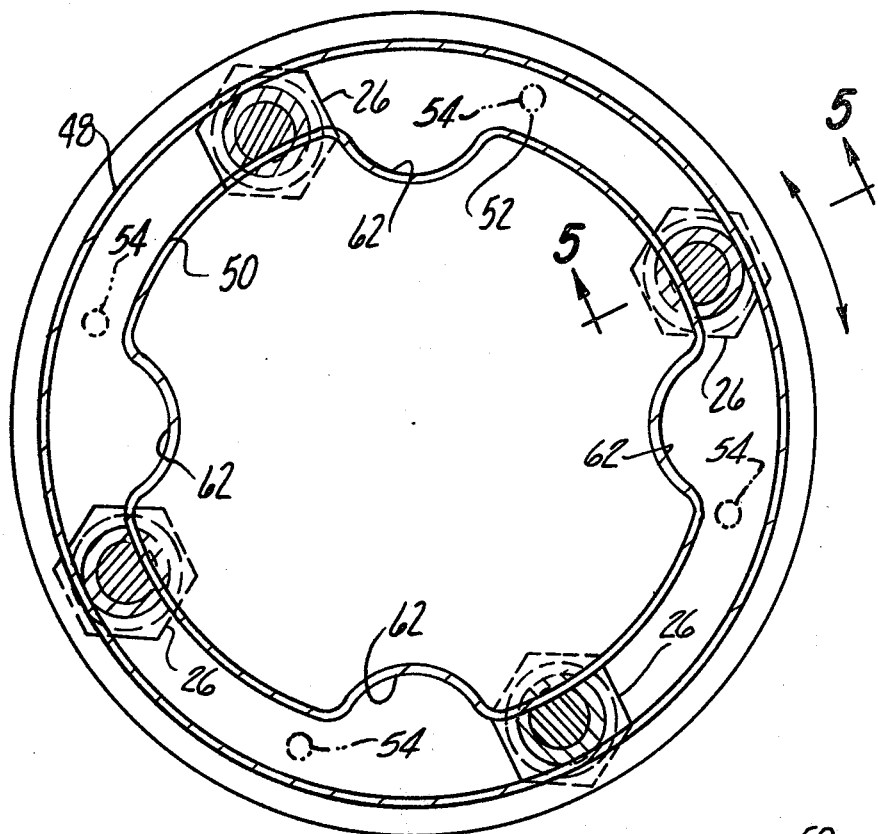
FIG. 4, is a view similar to FIG. 3 but showing another position of the wheel trim relative to the wheel.

Referring to the drawings and particularly to FIGS. 1 and 2, the wheel and trim assembly embodying the invention includes a wheel 12 and wheel trim 14. The wheel 12 has a drop center, tire reciving rim 16 attached to a metal disc or spider 18. The spider 18 is contoured to form a pleasing, attractive appearance and is provided with vent holes 20 symmetrically arranged relative to the wheel. The spider 18 also has a plurality of stud receiving openings 22 through which studs 24 extend to receive nuts 26 to secure the wheel 12 to the hub of a vehicle in a conventional manner. The stud receiving openings 22 and nuts 24 lie on an annular bolt circle spaced radially outwardly from an opening 28 in the wheel spider 18 which receives the hub or axle portion, not shown. The opening 28 is surrounded by an axially extending annular flange 30.

The stud receiving openings 22, studs 24 and nuts 25 are arranged in uniformly and circumferentially spaced relationship. In the illustrated embodiment of the invention four such stud openings are shown although it should be understood that a different number of uniformly arranged studs may be employed.

The wheel trim 14 is in the form of a cover member 38 adapted to cover the face of the wheel 12 and in particular the wheel retaining nuts 26. The wheel trim cover member 38 has a central cup shaped hub portion 40 and an outer annular rim 42 with a lip 44 which extends towards the face of the wheel spider 18. The trim or cover member 38 can be formed of plastic material and can take various ornamental configurations including the the placement of simulated decorative nuts 45 on the cover 38 as indicated in FIGS. 1 and 2.

The wheel trim 14 is held relative to the wheel 12 by a retention member 46 which has a radially outer annular flange 48 and a radially inner flange 50 forming a trough 52, the bottom of which receives annularly spaced screws 54 holding the retention member 46 in fixed position on the cover 38.

Figure 5:
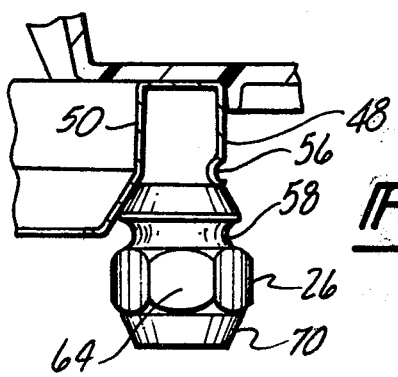
FIG. 5, is a cross-sectional view taken on line 5—5 in FIG. 4.
Figure 6:
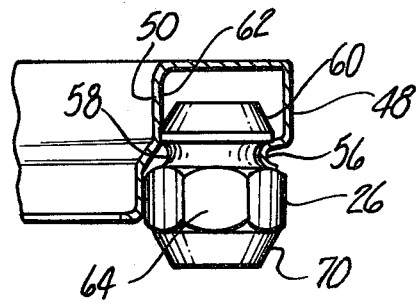
FIG. 6, is a cross-sectional view taken on line 6—6 in FIG. 3.

The outer flange 48 has a radially inwardly facing retaining part or bead 56 as best seen in FIGS. 5 and 6 which is complementary to retaining portions or grooves 58 extending annularly relative to each of the nuts 26. The bead 56 is at the outer end of the flange 48 so that it may flex radially in the area of the nuts and resiliently urge the bead 56 into engagement with grooves 58 in the nut. The nuts 26 are formed with a conical cam surface 60 which serves to engage the bead 56 when the wheel trim is moved axially as it is being mounted on the wheel to deflect the bead radially outwardly until it reaches the grooves 58 in each of the nuts 26 at which time it will snap into and be seated in the grooves.

The inner flange 50 of the retention member 46 has recesses 62 corresponding in number to the number of nuts 26 and serving to receive the nuts 26. The portion of the inner flange 50 between adjacent recesses 62 forms guide means which, as best seen in FIGS. 4 and 5, interfere with the mounting nuts 26 preventing attachment of the wheel trim 14 to the wheel 12 until the wheel trim member 14 is properly indexed to align the plurality of recesses 62 with the plurality of wheel retaining nuts 26. This insures that the wheel trim 14 is indexed symmetrically with the wheel 12. For example, the decorative nut 45 of the wheel trim member 14 seen in FIG. 1 become similarly and symmetrically aligned with the vent openings 20 formed in the wheel 12 for all four of the possible positions of the trim member 14 relative to the wheel 12. Also the walls of the recesses 62 engage the nuts 26 to prevent relative rotation of wheel 12 and the trim 14.

Figure 7:
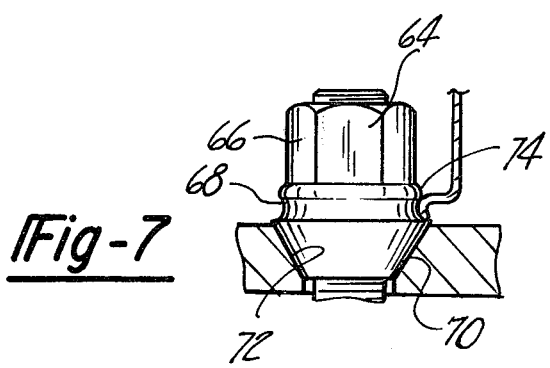
FIG. 7, is a cross-sectional view showing another form of wheel retaining nut.

The nut 26 shown in FIGS. 1 through 6 has an annular groove 58 at one side of wrench receiving surfaces 64 and a cam surface 60 at the other side of the wrench receiving surface 64 which serve to engage the bead 56 during relative axial movement of the wheel and wheel trim. Another form of nut 66 is shown in FIG. 7 in which an annular retaining groove 68 for receiving the bead 56 of the wheel trim member is formed adjacent to the conical seat 70 which seats on a complementary seating surface 72 surrounding the stud receiving openings 22 in the wheel 12. A lip 74 is formed at the opposite side of the groove 68 and acts as a cam to engage the bead 56 after it has passed over the wrench receiving surfaces 64 of the nut 26 so that the bead 56 is deflected radially outwardly and then snaps into the groove 68 where it is seated and retained.

With both types of the nuts 26 or 66, the retaining bead 56 of the trim or cover member 14 is deflected radially outwardly by either the cam 60 or 74 until the bead 56 comes into alignment with all of the grooves 58 and 68 on all of the nuts 26 or 66. Thereafter the bead 56 will resiliently snap into position into the respective grooves 58 and 68 and the wheel cover 14 is held axially fixed relative to the wheel. Relative rotation between the wheel trim member 14 and the wheel 12 is prevented by the recesses 62 in the wall or inner flange 50 which interferes with the wheel retaining nuts 26 or 66. Removal of the wheel trim member 14 from the wheel 12 is accomplished by inserting a tool such as a screwdriver or the like in the gap indicated at 78 in FIG. 2 and thereafter prying the cover 14 from the wheel. This causes the bead 56 to be deflected radially outwardly and to be lifted from the grooves in the nuts 26 and 66.

A wheel and trim assembly has been provided wherein a cover or trim member for a vehicle wheel is held in position by a retainer arrangement wherein a circumferential bead on a retaining member is deflected radially outwardly by cam means formed on wheel retaining nuts during relative axial movement of the trim member and the wheel. As the retaining bead comes into alignment with annular grooves formed on each of the nuts it snaps into position and seats in the grooves to prevent accidental removal of the trim member from the wheel. The retaining member also is formed with guide means such that the trim member can be attached to the wheel only in certain predetermined positions to insure that the trim member is symmetrically aligned with design features of the wheel.

The embodiments of the invention in which an exclusive property or privilege is claimed are defined as follows:

1. A wheel and trim assembly including a wheel having wheel mounting holes arranged on an annular circle to receive complementary mounting studs, nuts adapted to be mounted on said studs to retain said wheel in position, said nuts each having an annular retaining portion, said retaining portions being disposed in substantially the same plane, an ornamental wheel trim, retaining means forming part of said wheel trim and being engageable with said annular retaining portions at radially outward location on said nuts to prevent relative axial movement of said trim and said wheel, guide means on said wheel trim engageable with said nuts to obstruct attachment of said wheel trim except upon orientation of said trim and wheel in selected positions, said guide means including an annular wall having an outer surface with a diameter greater than the diameter of a circle passing through the radial inner surfaces of each of said nuts, and a plurality of radially inwardlly extending recesses formed in said wall to receive said plurality of nuts when said trim is oriented in said selected positions.

2. The combination of claim 1 wherein said guide means include portions engagable with said nuts when said wheel trim is in position on said wheel to limit relative rotation of said wheel and wheel trim.

3. The combination of claim 1 wherein said selected positions of said wheel trim member relative to said wheel are limited to the number of positions equal to the number of said nuts.

4. The combination of claim 1 wherein said annual wall interfers with said nuts except when said wheel trim member is in alignment with one of said selected positions.

5. The combination of claim 1 wherein said annular retaining portion includes an annular groove in each nut and wherein said retaining means on said wheel trim member is engageable in each of said grooves.

6. The combination of claim 5 wherein said retaining means extends radially inwardly to engage radial outer locations of said annular grooves.

7. The combination of claim 5 and further comprising cam means formed on said nuts to engage said retaining means and bias the latter radially outwardly during axial movement of said wheel trim member relative to said wheel.

8. The combination of claim 7 wherein said cam means is spaced to one side of wrench receiving portions on said nut and said annular groove is disposed between said cam means and said wrench receiving portions.

9. The combination of claim 7 wherein said cam means is formed adjacent to said groove and said groove is adjacent one side of the wrench receiving portion of said nut.

* * * * *

UNITED STATES PATENT AND TRADEMARK OFFICE
CERTIFICATE OF CORRECTION

PATENT NO. : 4,133,583
DATED : January 9, 1979
INVENTOR(S) : Edward G. Spisak

It is certified that error appears in the above-identified patent and that said Letters Patent are hereby corrected as shown below:

Column 1, line 49, "wheeel" should read --wheel--

Column 2, line 8, "reciving" should read --receiving-- line 68, "nut" should read --nuts--

Column 3, line 15, "wheel trim member" should read --wheel trim member 14-- line 29, "and 68" should read --or 68-- line 31, "58 and 68" should read --58 or 68--

Column 4, claim 1, line 13, "location" should read --locations-- line 21, "inwardlly" should read --inwardly--

Signed and Sealed this

Twenty-fourth Day of April 1979

[SEAL]

Attest:

RUTH C. MASON
*Attesting Officer*

DONALD W. BANNER
*Commissioner of Patents and Trademarks*